Oct. 26, 1954
C. W. GAYLER
2,692,405
MELT SPINNING APPARATUS
Filed June 30, 1949
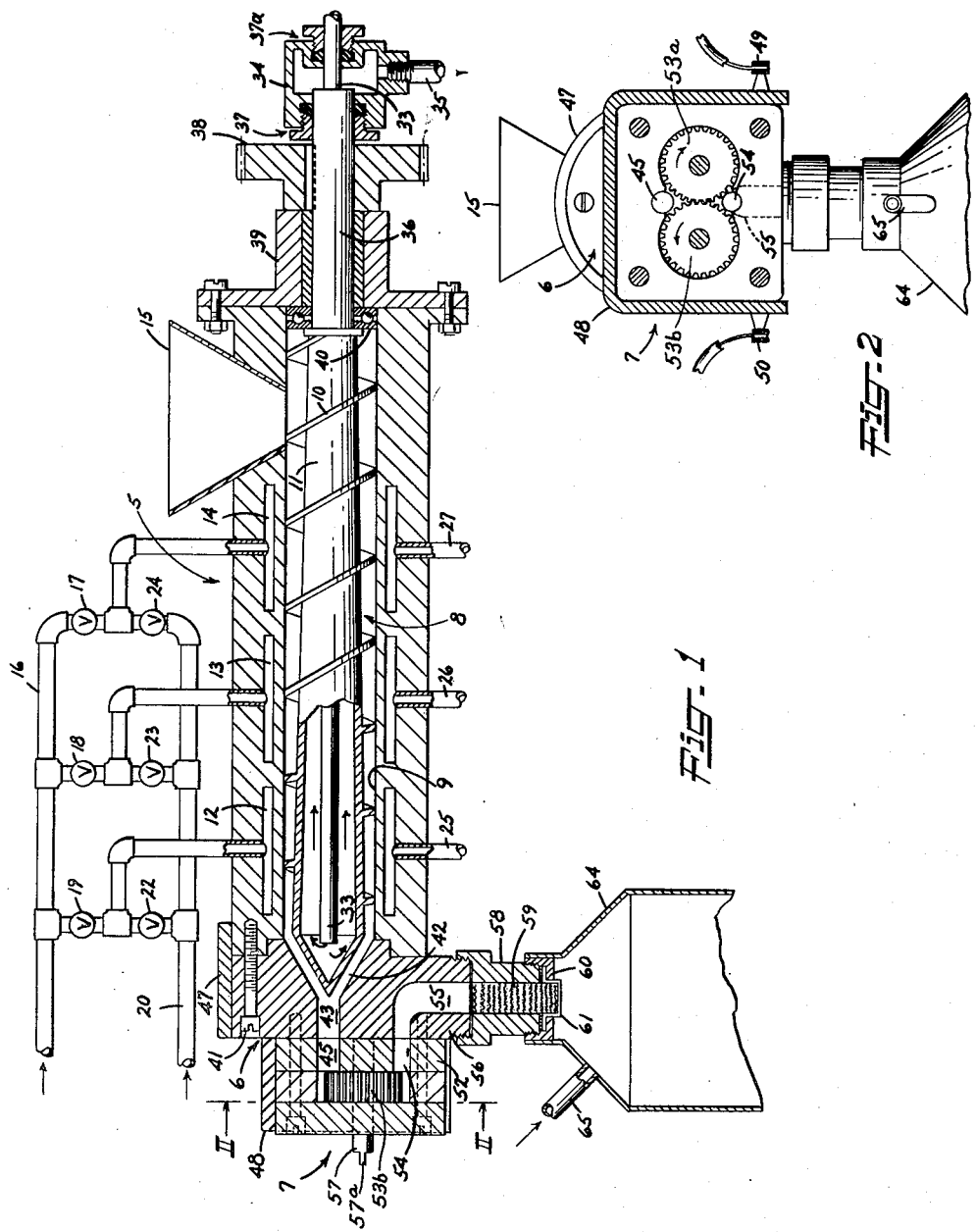
INVENTOR.
CECIL W. GAYLER
BY
Thomas R. ...
ATTORNEY.

Patented Oct. 26, 1954

2,692,405

UNITED STATES PATENT OFFICE 2,692,405

MELT SPINNING APPARATUS

Cecil W. Gayler, Ridley Park, Pa., assignor to American Viscose Corporation, Wilmington, Del., a corporation of Delaware Application June 30, 1949, Serial No. 102,401

4 Claims. (Cl. 18—8)

The present invention relates to a method and apparatus for melting and spinning powdered, granular, flaked, or other finely divided or particulate thermoplastic materials.

Heretofore, extrusion apparatus of the type employing a screw type conveyor has not been used for extruding filaments of diameters under approximately 0.005 of an inch although such apparatus has been commonly employed in continuously forming all types of larger shapes having a uniform longitudinal contour. This type of machine has not been suitable for the melting and spinning of fine filaments because of its inability to deliver the melted resin to a jet or spinneret at a uniform pressure and/or viscosity completely free of unmelted particles.

The conventional apparatus used for spinning the filaments of thermoplastic materials comprises, in general, a melting chamber provided with an exterior heating system and/or interiorly supported heating grids. Flaked or powdered resin is fed into the top of the chamber and allowed to become heated and finally melted into a liquid material which runs by gravity into a metering pump connected between the chamber and a spinneret. However, the material must be raised to the temperature at which it melts or becomes plastic and then raised to a still higher temperature to attain a low enough viscosity to allow it to flow by gravity, at an appreciable rate, to the spinning pump.

As practically all of the organic thermoplastic materials have low heat conductivity, the time required to melt the resin by the chamber-type of apparatus just described is considerable. While such an apparatus is reasonably satisfactory for melting preparatory to spinning some of the more heat-stable types of resins, the apparatus is highly unsuitable for melting resins which have a temperature of decomposition which differs but a few degrees from the temperature of melting, or from a temperature at which the melt has a suitable viscosity for spinning. Such decomposition might come about either as a result of too lengthy a period of heating or from overheating the material directly in contact with the heating medium such as the walls of a melting chamber. When melting some of the resins, the temperature at which the heating medium must be maintained in order to obtain any practical rate of melting is too close to the decomposition temperature of the resin to assure dependable spinning of fine filaments. Moreover, since the resin is maintained for relatively long heating periods within such apparatus, the melted resin may undergo chemical changes and decompositions as the result of contact with air or other sources of oxygen. In such event, it is necessary to feed nitrogen or other inert gas into the chamber.

It is an object of the invention to provide an improved method and an apparatus for continuously melt-spinning fine filaments from thermoplastic materials. It is also an object to provide an apparatus whereby rapid melting of a resinous material is obtained. It is a further object of the invention to apply heat to the resin by a heating medium maintained at a temperature only slightly higher than that of the resin when brought to the proper viscosity for spinning, in order to avoid decomposition and the formation of gaseous decomposition products. Still another object of the invention is to produce filaments of uniform denier by an entirely continuous process. It is also an object to eliminate the need for displacing air from the melt with nitrogen, carbon dioxide or other inert gases to prevent the decomposition of thermosensitive, filament-forming materials while subjected to the melting process. Other objects, features and advantages will become apparent as the invention is described with reference to the drawing illustrating the invention in which Fig. 1 is an elevation view with portions sectioned along the principal axis of rotation of the apparatus; and Fig. 2 is a section view taken along line II—II of Fig. 1.

In brief, the invention comprises a method and apparatus for melting and spinning thermoplastic materials whereby the material is passed through an exteriorly and/or interiorly heated screw-type extruder, a heated metering pump mounted adjacent to, and in series with, the extruder, and a spinneret or jet adjacent to and connected with the discharge side of the pump. A resin is progressively heated and packed or condensed until it becomes liquified to a desired viscosity while being conveyed by the screw of the extruder. The liquid resin is received by the pump and forced at a uniform rate through a spinneret having orifices of 0.010 to 0.005 inch diameter for producing filaments of textile denier. Filaments of very fine denier are obtained by drawing the material away from the jet at several times the speed at which it passes through the jet and/or by after-stretching or cold-drawing the filaments after they are spun.

Fig. 1 illustrates as principal elements of the apparatus of the invention, a screw extrusion device 5, an extrusion head 6 and a gear-type metering pump 7. The extrusion device 5 is provided with a helically threaded rotatable member 8 of which the spindle or core 11 is tapered with respect to the interior surface 9 of the barrel or casing so that there is progressively less clearance between the wall 9 and the spindle toward the discharge end of the extruder 5. The depth of the thread 10 decreases as the diameter of the spindle increases. By this arrangement, resinous material introduced into the extruder through a funnel-like member 15 and passed through the extruder, is brought closer and into more frequent and intimate contact with the heated surfaces of the member 8 and the surrounding casing 9 as the resinous material becomes denser and more plastic or fluid in passing through the device 5. Moreover, as the resin is compressed and heated, any air or other gas carried within the mass of particles is forced rearwardly toward the lower pressure area at the feed end of the extruder and escapes. Thus the resin is freed from an oxidizing atmosphere before it reaches the temperature at which it would decompose in such an atmosphere. Consequently, it is not necessary to maintain an inert atmosphere at the feed end of the machine.

Heating of the casing is obtained by circulating a fluid heating medium through the passageways 12, 13 and 14 of the jacketed walls of the casing. By the conduit arrangement shown, heating or cooling of any of the portions of the extruder walls containing the passageways may be obtained as desired. In handling some types of resins, cooling of one or more passageways may be preferred while the remainder are heated. If it is desired to cool the region surrounded by the passageway 14, a fluid cooling medium may be supplied thereto through a line 16. In this event, valve 17 will be open and valves 18 and 19 will be closed. A liquid or gaseous heating medium may then be supplied to passageways 12 and 13 from the line 20. To accomplish circulation of the heating medium through both passageways, valves 22 and 23 are open and valve 24 is closed. Heating or cooling media may leave the passageways through drain lines 25, 26 or 27.

Since each of the passageways of the jacketed extruder barrel are separately connected with the heating and cooling medium supply lines 16 and 20, the temperature of any zone of the extruder may be controlled by the ratio of heating and cooling medium fed into the corresponding passageway of the extruder wall. For example, it may be desirable to maintain passageway 13 at a temperature intermediate to that of the heating medium which is flowing through the passageway 12 and that of the cooling medium flowing through passageway 14. To obtain the desired temperature, heating and cooling media are admitted to passageway 13 in the proper ratio by adjusting the valves 18 and 23. While only three heating or cooling passageways are shown, more or less may be provided in accordance with the sensitivity of heating control desired. One or more cooling passageways near the material receiving end of the helical extrusion device may be used to prevent excessive heating which may occur in the feed region and cause decomposition of the resin while the resin is incompletely melted and in contact with appreciable air.

The core 11 of the helical element 8 may be solid if preferred, but as shown, it is hollow to permit the introduction of a heating fluid through a tube 33 extending longitudinally through substantially the entire region enclosed by the core wall. The tube 33 terminates in an open end within the end portion of core 11 nearest the discharge region of the extrusion device. The tubing 33 is connected with an exterior supply of a heating fluid not shown. Fluid is discharged through the open end of the tube 33 and returned along the annular region between the tube and the inner surface of the core 11 to a non-rotatable housing 34 connected with a drain line 35 into which an extension 36 of the core or spindle extends. The housing 34 is provided with packing glands 37 and 37a surrounding the extension 36 and tube 33, respectively, to direct the heating medium into the drain 35. The packing glands may be dispensed with when, for example, the medium is not discharged from the extruder portions under appreciable gage pressure. A gear 38 is secured on the portion of the member 8 immediately protruding from a thrust bearing 40 and a radial support bearing 39, so that the extruder may be connected in driving relationship with a rotary power source.

By a heating arrangement such as above described, the temperature of the various axially spaced zones of the extrusion device 5 may be accurately controlled. While circulating a fluid through passageways provided in the various portions of the extruder is a preferred method for heating the member 8, heat may be applied to the barrel or casing in any practical manner such as by electrical heating elements (not shown) corresponding to the fluid-conducting passageways 12, 13 and 14. It is preferred that an arrangement be adopted whereby the axially-spaced sections of the extrusion device 5 may be independently heated.

In order to obtain the efficient heat conductivity which is so essential to the operation of the present invention, the resin is transported through progressively less clearance between the screw 8 and the casing as it passes through the extrusion device 5. While the apparatus shown embodies a design preferred because of its simplicity and the facility with which it may be built, the shape of the screw element and the casing or barrel therefor may readily take other longitudinally varying contours so long as the principle of transporting and mixing the progressively heated resin through a progressively restricted annular passage is adhered to. This principle is applied in order to impart heat to the filament-forming resins at temperatures sufficiently low to avoid decomposition or other deterioration of the resin while obtaining efficient melting. It is necessary to obtain efficient heat transfer between the extruder parts and the resin by a procedure in which the material is continuously mixed and then brought into contact with heated extruder parts. As the resin reaches a temperature corresponding to a proper spinning viscosity, it is quickly passed to the spinneret by the pump. Such an apparatus and method are particularly advantageous when handling the types of resins which decompose or undergo chemical changes such as further polymerization at temperatures slightly above that of an optimum spinning viscosity.

In the embodiment of the invention shown in the drawing, the melted resin passes through an extrusion head 6 attached to the end of the screw extruder 5 by such means as a plurality of cap screws 41. It is provided with a conical region 42 in which the end of the screw 8 extends. Region 42 narrows into a passageway 43 through which the material enters the intake port 45 of the pump 7. To accurately control the temperature of the material discharged from the extruder, the extruder head 6 and the pump 7 are provided with electric heaters 47 and 48, respectively, in contact with their outer surfaces. These heaters are provided with terminals such as 49 and 50 which may be connected with rheostats or other variable controlling devices to provide the flexibility needed to adapt the apparatus for spinning materials varying in composition, and for varying the spinning rate.

The pump 7, as may be seen from Fig. 2, is a two-gear positive-displacement type, fabricated from heat resisting metal with tolerances so that it operates efficiently at the temperatures required for extrusion, which frequently are as high as 300° C. or more. The pump housing, as shown, is generally box-shaped, and both the intake port and the discharge port thereof extend through the member 52 of the housing so that the pump may be bolted directly onto the extrusion head 6. The intake port 45 of the pump is contiguous with the passage 43 and its exhaust port 54 is contiguous with a passage 55 of the extruder head. The passage 55 terminates in an annular member, or nozzle 56 which may be exteriorly threaded to receive a housing 58 for screens or filters.

The pump 7 is driven in the manner conventional for a pump of the gear type, i. e., by rotative power applied to one of the gears 53a, 53b. As shown, a shaft 57 on which the gear 53b is mounted extends exteriorly of a surface of the pump housing which is disposed externally of the other portions of the apparatus herein described. The shaft terminates as a tongue portion 57a adapted for being coupled to a rotary driving member (not shown) having a complementary groove or slot. The axis of both gears may be offset with respect to the axis of the screw member 8, as shown. Thus a portion of the shaft extruding from the pump housing constitutes means for driving the pump independently of the gear 38 by which the extruder screw 8 is driven.

The housing 58 may contain a pack consisting of several screens 59 through which the melted resin must pass before being extruded. The screens are of a fineness, such as around 200 mesh, that they homogenize the melted resin and any gas which may be mixed therewith. These screens produce back pressure on the resin so that the gas is redissolved. However, with the present device the number of screens required is less for satisfactory homogenizing of the gas and resin than the number required in previous types of melt spinning devices since there is little gas in the melt due to decomposition of the resin resulting at higher temperature for longer periods of time such as employed in using the prior art devices. At the melted resin comes out of the jet, the pressure is relieved, but at the same time the temperature is reduced. As the temperature drops, the ill effects which might result from dissolved gas are largely neutralized.

The exterior surface of the housing 58 is threaded to receive an interiorly threaded coupling 60 used to secure a spinneret 61 to the housing. A shroud 64 which surrounds the region into which filamentary material is discharged from the spinneret 61, is secured about the housing 58. An inert gas such as nitrogen or carbon dioxide may be introduced through a tube 65 into the region enclosed by the shroud to displace air or other oxidizing atmosphere which might deleteriously affect the hot filaments being discharged from the spinneret. The filamentary material may be received by a take-up means (not shown) and stretched while being withdrawn to any degree to obtain desired properties or a specific reduction in the denier of the filament.

There are many organic plastic compositions, principally in the general class of synthetic resins or resinoid materials, to which the apparatus and the method of spinning filaments according to this invention may be applied. Substances such as synthetic fiber-forming linear condensation-type polyamides, polycarbonamides, copolymers of vinyl chloride with vinyl acetate, copolymers of vinylidene chloride with vinyl chloride, polymethylmethacrylate, polymers and copolymers of acrylonitrile, e. g. with vinyl chloride, vinylidene chloride, vinyl pyridines, isobutylene, etc., plasticized cellulose esters, e. g. cellulose acetate, cellulose acetate butyrate, etc., and many other compositions or materials which possess to a greater or lesser degree the thermoplastic and other properties which render a material suitable for fine filament formation by the apparatus of this invention.

Since the chemical and physical differences of the thermoplastic filament-forming compositions contemplated by the invention are such that no two will necessarily require the same speed and temperature adjustments of the apparatus, it is impossible to predict the optimum conditions under which the apparatus may be operated in all cases. Therefore, the optimum speeds of the extruder and the pump, and the temperatures to which the pump, the extruder head, and the various zones of the extruder are to be heated to satisfactorily spin fine filaments from a given composition, may best be determined by preliminary testing.

While preferred embodiments of the invention have been shown and described, it is to be understood that changes and variations may be made without departing from the spirit and scope of the invention as defined in the appended claims.

I claim:

1. Apparatus for extruding a plastic material comprising a screw-type extruder, a positive displacement pump having an inlet port and an outlet port, and a spinneret; said extruder comprising a barrel having a feed section and a discharge end, a screw rotatably supported within the barrel, and a head for enclosing said discharge end; the spinneret and the pump being supported on separate portions of the head, the head having two passageways terminating in surface portions in abutting relationship with mating surface portions of the pump, the ports of the pump being disposed within said surface portions of the pump, one of the passageways connecting the region enclosed by the barrel through its discharge end with the inlet port, the other passageway extending between the outlet port and a region enclosed by the spinneret.

2. Apparatus as defined in claim 1 comprising means for heating the extruder head.

3. Apparatus for extruding a plastic material comprising a screw-type extruder, a positive displacement pump having an inlet port and an outlet port, and a spinneret; said extruder comprising a barrel having a feed section and a discharge end, a screw rotatably supported within the barrel, and a head for enclosing said discharge end, the head having two passageways terminating in surface portions of the head disposed on a side thereof facing away from the barrel and in abutting relationship with mating surface portions of the pump, the ports of the pump being disposed within said surface portions of the pump, the spinneret being supported on a portion of the head which is separate from that supporting the pump, said head portion facing in a direction that is transverse with respect to the direction in which said mating surface portions face, one of the passageways connecting the region enclosed by the barrel through its discharge end with the inlet port, the other passageway extending between the outlet port and a region enclosed by the spinneret.

4. Apparatus for extruding a plastic material comprising a screw-type extruder, a spinneret, and a positive displacement pump having an intake port and an outlet port; said extruder comprising a barrel having a feed section and a discharge end, a screw rotatably supported within the barrel, and a head for enclosing the discharge end, the head being disposed generally between the barrel and the pump and having surfaces on opposite sides thereof in abutting relationship with the barrel and the pump respectively, the ports of the pump extending from surface portions in abutment with the head, said spinneret being connected to a portion of the head that is lateral with respect to the screw axis, the head having two passageways, one extending through the head from the region enclosed by the barrel to the intake port and the other passageway extending from the outlet port to and through the lateral portion into communication with the inner surface of the spinneret.

References Cited in the file of this patent

UNITED STATES PATENTS

| Number | Name | Date |
|---|---|---|
| 1,516,968 | Johnson | Nov. 25, 1924 |
| 1,788,821 | Brown | Jan. 13, 1931 |
| 1,912,374 | Johnson | June 6, 1933 |
| 2,217,743 | Greenewalt | Oct. 15, 1940 |
| 2,252,689 | Bradshaw | Aug. 19, 1941 |
| 2,369,553 | Fields | Feb. 13, 1945 |
| 2,411,971 | MacMillin et al. | Dec. 3, 1946 |
| 2,437,686 | Dreyfus | Mar. 16, 1948 |
| 2,478,013 | Roddy | Aug. 2, 1949 |
| 2,515,201 | Dulmage et al. | July 18, 1950 |